US012030303B2

(12) United States Patent
Tsutsui et al.

(10) Patent No.: US 12,030,303 B2
(45) Date of Patent: Jul. 9, 2024

(54) PRINTING APPARATUS FOR PERFORMING PRINTING TO AN ELONGATED PRINT MEDIUM

(71) Applicant: SCREEN HOLDINGS CO., LTD., Kyoto (JP)

(72) Inventors: Yuki Tsutsui, Kyoto (JP); Mitsuru Tanemoto, Kyoto (JP); Takahiro Uda, Kyoto (JP); Masaki Era, Kyoto (JP)

(73) Assignee: SCREEN HOLDINGS CO., LTD., Kyoto (JP)

( * ) Notice: Subject to any disclaimer, the term of this patent is extended or adjusted under 35 U.S.C. 154(b) by 0 days.

(21) Appl. No.: 18/324,463

(22) Filed: May 26, 2023

(65) Prior Publication Data

US 2023/0294422 A1 Sep. 21, 2023

Related U.S. Application Data

(63) Continuation of application No. 17/387,262, filed on Jul. 28, 2021, now Pat. No. 11,697,293.

(30) Foreign Application Priority Data

Aug. 25, 2020 (JP) ................................ 2020-141726

(51) Int. Cl.
*B41J 11/00* (2006.01)

(52) U.S. Cl.
CPC ...... *B41J 11/0024* (2021.01); *B41J 11/00216* (2021.01); *B41J 11/0022* (2021.01)

(58) Field of Classification Search
CPC .............. B41J 11/0024; B41J 11/00216; B41J 11/0022; B41J 15/04; F26B 3/283; F26B 3/30; F26B 13/006
See application file for complete search history.

(56) References Cited

U.S. PATENT DOCUMENTS 9,994,049 B1 6/2018 Boland et al.
2009/0297245 A1* 12/2009 Godden .............. B41F 23/0403 101/487
2020/0031142 A1 1/2020 Izawa et al.

FOREIGN PATENT DOCUMENTS

CN 110406252 A 11/2019
JP 2016-186342 A 10/2016
(Continued)

OTHER PUBLICATIONS

Extended European Search Report issued in corresponding European Patent Application No. 21188042.2-1017, dated Jan. 5, 2022.
(Continued)

*Primary Examiner* — Bradley W Thies
(74) *Attorney, Agent, or Firm* — Rimon P.C.

(57) ABSTRACT

Disclosed is a printing apparatus in which web paper is transported to a printing face contact roller in a swirling form while a direction thereof is turned by first to fourth turning rollers. Heating units are arranged so as to face a printing face of the web paper between the two first and second turning rollers, between the two third and fourth turning rollers, and between the fourth turning roller and the printing face contact roller individually. Such arrangement can achieve a compact drying mechanism. The heating units each directly heat inks on the printing face, and thus do not overheat the web paper. Moreover, the heating units are not directed upward. This avoids contact of the web paper to a front side face of each of the heating units when the web paper slackens.

3 Claims, 7 Drawing Sheets

(56) References Cited

FOREIGN PATENT DOCUMENTS

| | | |
|---|---|---|
| JP | 2019-064059 A | 4/2019 |
| JP | 2019-119609 A | 7/2019 |

OTHER PUBLICATIONS

U.S. PTO Non-Final Office Action issued in related in U.S. Appl. No. 17/387,262, dated Oct. 25, 2022.
U.S. PTO Notice of Allowance issued in related in U.S. Appl. No. 17/387,262, dated Feb. 27, 2023.

* cited by examiner

PRINTING APPARATUS FOR PERFORMING PRINTING TO AN ELONGATED PRINT MEDIUM

CROSS-REFERENCE TO RELATED APPLICATIONS

This is a Continuation of U.S. patent application Ser. No. 17/387,262 filed on Jul. 28, 2021, which claims priority to Japanese Patent Application No. 2020-141726 filed Aug. 25, 2020, the subject matter of which is incorporated herein by reference in entirety.

TECHNICAL FIELD

The present invention relates to a printing apparatus for performing printing to an elongated print medium.

BACKGROUND ART

A printing apparatus includes a drying mechanism configured to dry inks adhering to a print medium (e.g., web paper). See, for example, Japanese Patent Publication No. 2016-186342A. The drying mechanism includes at least one of a heating drum, an air-blowing device, and an infrared ray heating device.

Japanese Patent Publication No. 2016-186342A discloses the drying apparatus configured to heat a rear face (non-printing face) of a print medium in a contact manner by winding the print medium onto an outer circumferential face of the heating drum (heating roller) large in mass and specific heat.

Japanese Patent Publication No. 2019-119609A discloses an air turn bar provided along a transportation path of a print medium. The air turn bar ejects air. Thereby, the print medium can be transported while a gap is provided between the air turn bar and a surface (printing face) of the print medium. Accordingly, the air turn bar can perform fold the print medium without contacting the surface of the print medium with use of the surface of the print medium as an inner periphery of the fold.

SUMMARY OF INVENTION

Technical Problem

However, the currently-used printing apparatus possess the following problems. Specifically, the heating drum heats the print medium by contacting the rear face of the print medium (e.g., continuous paper). If the print medium is heated from the rear face thereof in a contact manner, the print medium may be overheated. This may lead to possibility of reduction in paper quality after printing such as loss of flexibility of the continuous paper. Moreover, the inks are heated via the print medium, which may cause reduction in drying efficiency.

Moreover, when the print medium slackens due to an emergency stop, for example, the print medium may contact a front side face of the heating unit depending on directions of the heating unit of a non-contact type. This may lead to overheat of the print medium at a contact region thereof. Moreover, when a roller contacts a printing face of the print medium while the inks are not dried, the inks may be transferred. Accordingly, there is a desire to dry the inks adhering to the print medium to such an extent that they are not transferred until when the print medium reaches the roller contacting the printing face. Such a desire should be achieved without using the air turn bar disclosed in Japanese Patent Publication No. 2019-119609A.

The present invention has been made regarding the state of the art noted above, and its object is to provide a printing apparatus that dries inks on a printing face of a print medium without overheating the print medium until when the print medium reaches a roller contacting the printing face while preventing the print medium from contacting a front side face of a heating unit.

Solution to Problem

The present invention is constituted as stated below to achieve the above object. One aspect of the present invention provides a printing apparatus including a printing unit configured to cause inks to adhere to a printing face of an elongated print medium to be transported, and a drying mechanism configured to dry the inks by heating the print medium unloaded from the printing unit. The drying mechanism includes at least a first turning roller, a second turning roller, a third turning roller and a fourth turning roller each configured to contact a rear face of the print medium unloaded from the printing unit with no inks adhering thereto to turn a transportation direction of the print medium, a printing face contact roller located downstream of the fourth turning roller in the transportation direction and configured to contact the printing face of the print medium to turn the transportation direction of the print medium, and at least a first heating unit, a second heating unit, and a third heating unit each configured to heat the print medium guided by the first to fourth turning rollers and the printing face contact roller. The first turning roller turns a direction of the print medium, unloaded from the printing unit, vertically downward or diagonally downward such that the printing face of the print medium is directed upward, the second turning roller turns a direction of the print medium, whose direction is turned by the first turning roller, such that the printing face is directed downward, the third turning roller turns a direction of the print medium, whose direction is turned by the second turning roller, vertically upward or diagonally upward such that the printing face of the print medium is directed upward, and the fourth turning roller turns a direction of the print medium, whose direction is turned by the third turning roller, horizontally such that the printing face is directed upward or diagonally downward such that the printing face is directed upward. The first heating unit is located so as to face the printing face of the print medium and heats the print medium in a non-contact manner between the first turning roller and the second turning roller. The print medium is transported without being heated between the second turning roller and the third turning roller. The second heating unit is located so as to face the printing face of the print medium and heats the print medium in a non-contact manner between the third turning roller and the fourth turning roller. The third heating unit is located so as to face the printing face of the print medium and heats the print medium in a non-contact manner between the fourth turning roller and the printing face contact roller. The printing face contact roller firstly contacts the printing face of the print medium after the inks adhere, and guides the print medium to an outlet of the drying mechanism by folding the print medium with the inks being dried.

With the printing apparatus according to the present invention, the elongated print medium is transported to the printing face contact roller in a swirling form while a direction thereof is turned by the first to fourth turning rollers. The printing face contact roller firstly contacts the printing face after the inks adhere. The heating units are arranged between the first and second turning rollers, between the third and fourth turning rollers, and between the fourth turning roller and the printing face contact roller individually so as to face the printing face of the print medium. Such arrangement can achieve a compact drying mechanism.

Moreover, the heating units each face the printing face, and thus can directly heat the inks adhering to the printing face. Accordingly, the inks can be dried while the print medium is not overheated. Moreover, the heating units are not arranged upward. Moreover, the heating units are not each arranged in a section where the printing face is directed downward (between the second and third turning rollers). This is because the arranged heating units are directed upward. Accordingly, when the print medium slackens, the print medium can avoid contact to the front side face of each of the heating units. This can prevent overheating of the print medium.

Moreover, it is preferred in the printing apparatus described above that the fourth turning roller turns a direction of the print medium, whose direction is turned by the third turning roller, diagonally downward such that the printing face is directed upward. The third heating unit is inclined along the print medium whose direction is turned by the fourth turning roller. As a result, the third heating unit can be arranged effectively with use of a space between a part of the print medium transported between the first and second turning rollers and a part of the print medium transported between the third and fourth turning rollers. This can achieve a compact drying mechanism.

Moreover, it is preferred in the printing apparatus described above that the first turning roller turns a direction of the print medium, unloaded from the printing unit, vertically downward and the third turning roller turns a direction of the print medium, whose direction is turned by the second turning roller, vertically upward. Accordingly, the first and second heating units are each erected vertically. As a result, a compact drying mechanism is obtainable in a horizontal longitudinal direction where the first and second heating units are arranged.

Moreover, it is preferred in the printing apparatus described above that the first to third heating units each include a heater configured to emit electromagnetic waves to the printing face of the print medium. The heater emits the electromagnetic waves to the printing face, allowing direct heating of the printing face.

Moreover, it is preferred in the printing apparatus described above that the heater is a carbon heater. With use of the carbon heater, infrared rays having an optimum wavelength for heating the inks can be emitted.

Moreover, it is preferred that the printing apparatus further includes a first reflector, a second reflector, and a third reflector. The first reflector is located across the print medium transported between the first turning roller and the second turning roller and opposite to the first heating unit. The second reflector is located across the print medium transported between the third turning roller and the fourth turning roller and opposite to the second heating unit. The third reflector is located across the print medium transported between the fourth turning roller and the printing face contact roller and opposite to the third heating unit. The reflectors each reflect electromagnetic waves emitted from the heater of the heating unit and passing through the print medium. Accordingly, the reflected electromagnetic waves can again be emitted to the print medium. This can lead to effective usage of the electromagnetic waves emitted from the heater.

Moreover, it is preferred in the printing apparatus described above that the first to third heating units each further include a gas-blowing unit configured to blow out gas heated with the heater to the printing face. Emission of the electromagnetic waves and warm gas can dry the inks on the printing face.

Moreover, it is preferred in the printing apparatus described above that the drying mechanism further includes a maintenance space for maintenance that is enclosed with a part of the print medium transported from the second turning roller to the printing face contact roller. This yields enhanced maintainability of the drying mechanism.

Moreover, it is preferred in the printing apparatus described above that the drying mechanism further includes a guide roller located downstream of the printing unit and upstream of the first turning roller and configured to guide the print medium while contacting the rear face of the print medium, and a fourth heating unit configured to heat the print medium guided by at least the guide roller. The guide roller turns a direction of the print medium, unloaded from the printing unit, diagonally downward such that the printing face of the print medium is directed upward. The first turning roller turns a direction of the print medium whose direction is turned by the guide roller. The fourth heating unit is located so as to face the printing face of the print medium and heats the print medium in a non-contact manner between the guide roller and the first turning roller.

Accordingly, the first to fourth heating units can heat the print medium guided by the first to fourth turning rollers and the guide roller.

Moreover, it is preferred that the printing apparatus described above further includes a plurality of downstream guide rollers located downstream of the printing face contact roller. The downstream guide rollers guide the print medium, folded by the printing face contact roller, to the outlet of the drying mechanism while passing the print medium through a gap formed by the fourth turning roller and a part of the print medium transported between the guide roller and the first turning roller. The print medium is guided in a swirling form by the guide roller, the first to fourth turning rollers, and the printing face contact roller. The downstream guide rollers can guide the print medium to the outlet of the drying mechanism while guiding the print medium, wound toward the inside of the swirling form, toward the outside of the swirling form.

Another aspect of the present invention provides a printing apparatus including a printing unit configured to cause inks to adhere to a printing face of an elongated print medium to be transported, and a drying mechanism configured to dry the inks by heating the print medium unloaded from the printing unit. The drying mechanism includes at least a first turning roller, a second turning roller, a third turning roller, a fourth turning roller, and a fifth turning roller each configured to contact a rear face of the print medium unloaded from the printing unit with no inks adhering thereto to turn a transportation direction of the print medium, a printing face contact roller located downstream of the fifth turning roller in the transportation direction and configured to contact the printing face of the print medium to turn the transportation direction of the print medium, and at least a first heating unit, a second heating unit, and a third heating unit each configured to heat the print medium guided by the first to fifth turning rollers and the printing face contact roller. The first turning roller turns a direction of the print medium unloaded from the printing unit vertically downward, the second turning roller turns a direction of the print medium, whose direction is turned by the first turning roller, such that the printing face is directed downward, the third turning roller turns a direction of the print medium, whose direction is turned by the second turning roller, vertically upward, the fourth turning roller turns a direction of the print medium, whose direction is turned by the third turning roller, such that the printing face is directed upward, and the fifth turning roller turns a direction of the print medium, whose direction is turned by the fourth turning roller, vertically downward. The first heating unit is located so as to face the printing face of the print medium and heats the print medium in a non-contact manner between the first turning roller and the second turning roller. The print medium is transported without being heated between the second turning roller and the third turning roller. The second heating unit is located so as to face the printing face of the print medium and heats the print medium in a non-contact manner between the third turning roller and the fourth turning roller. The third heating unit is located so as to face the printing face of the print medium and heats the print medium in a non-contact manner between the fifth turning roller and the printing face contact roller. The printing face contact roller firstly contacts the printing face of the print medium after the inks adhere, and guides the print medium to an outlet of the drying mechanism by folding the print medium with the inks being dried.

Advantageous Effects of Invention

The printing apparatus according to the present invention can dry inks on a printing face of a print medium without overheating the print medium until when the print medium reaches a roller contacting the printing face while preventing the print medium from contacting a front side face of a heating unit.

BRIEF DESCRIPTION OF DRAWINGS

For the purpose of illustrating the invention, there are shown in the drawings several forms which are presently preferred, it being understood, however, that the invention is not limited to the precise arrangement and instrumentalities shown.

FIRST EMBODIMENT

Figure 1:
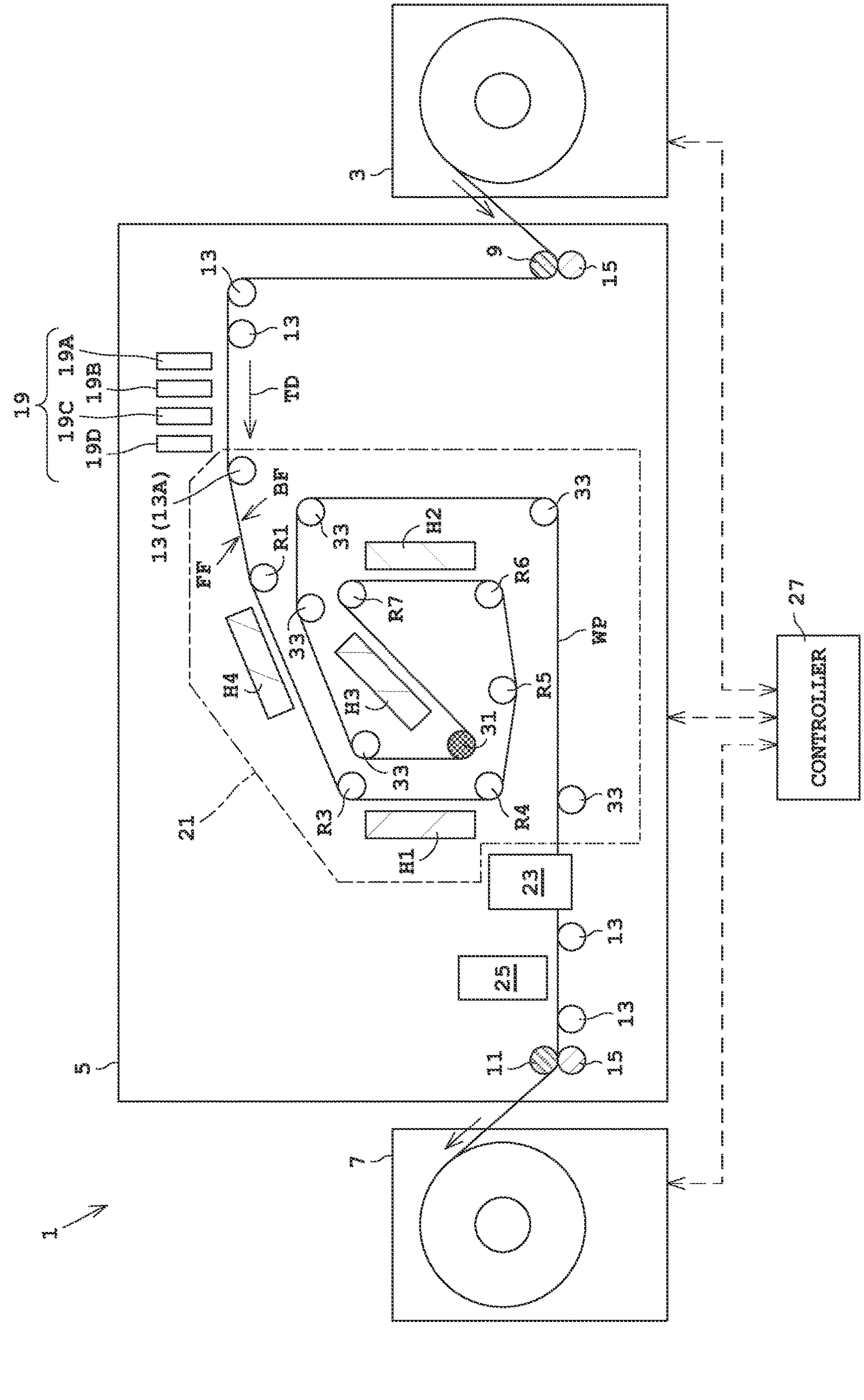
FIG. 1 schematically illustrates a printing apparatus according to a first embodiment of the present invention.
Figure 2:
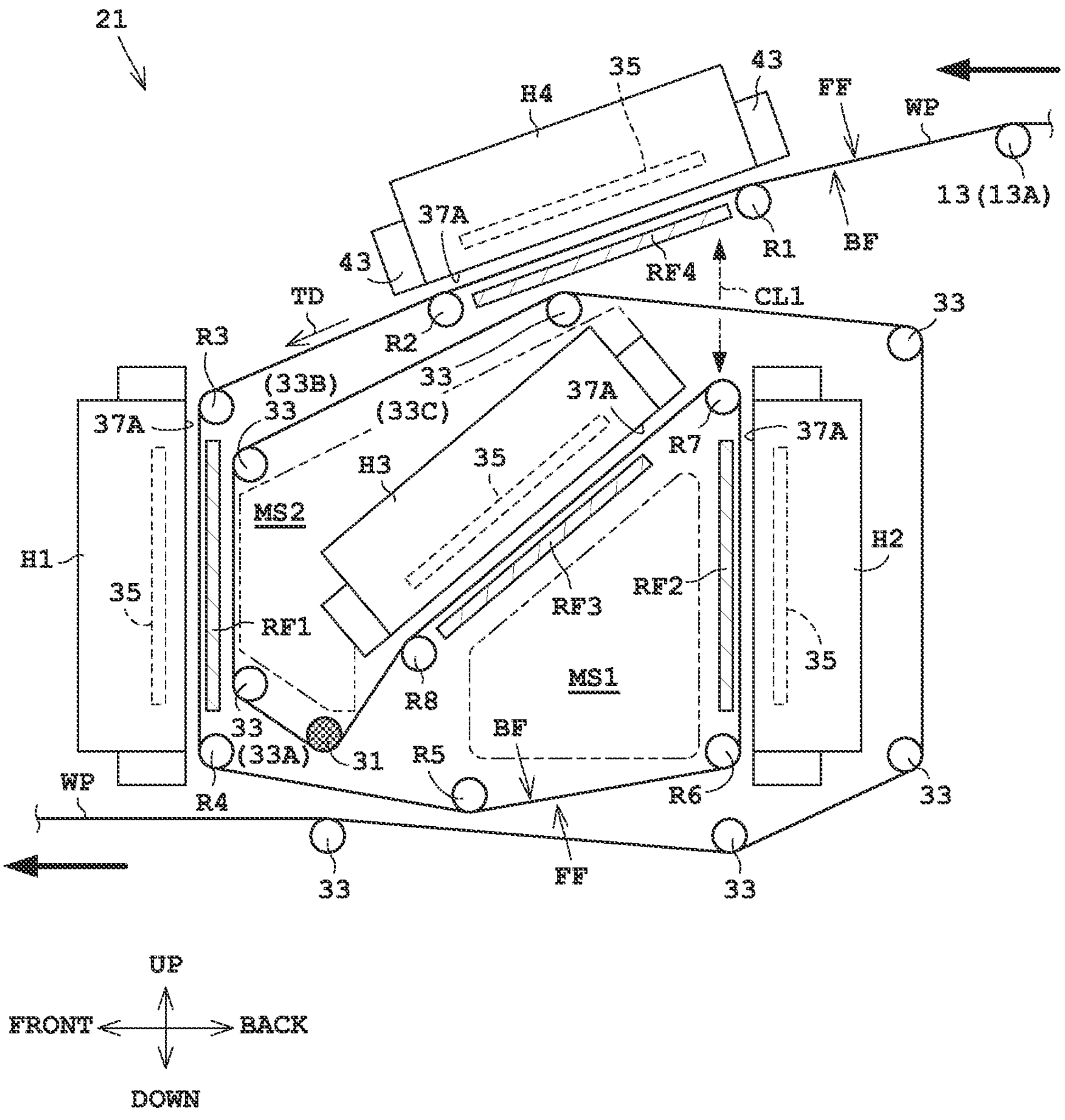
FIG. 2 illustrates a drying mechanism according to the first embodiment.

A first embodiment of the present invention will now be described with reference to the drawings. FIG. 1 schematically illustrates a printing apparatus 1 according to a first embodiment of the present invention. FIG. 2 illustrates a drying mechanism 21 according to the first embodiment.

Construction of Printing Apparatus 1

Reference is made to FIG. 1. The printing apparatus 1 according to the present embodiment is an inkjet printing apparatus. The printing apparatus 1 includes a paper feeder 3, a printing apparatus body 5, and a take-up roller 7.

The paper feeder 3 holds a roll of web paper (continuous paper) WP rotatably about a horizontal axis. The paper feeder 3 feeds the web paper WP from the roll of the web paper WP to the printing apparatus body 5. The printing apparatus body 5 performs printing on the elongated web paper WP. Then, the take-up roller 7 winds up the web paper WP printed by printing apparatus body 5 around the horizontal axis. The take-up roller 7 includes an electric motor configured to wind up the web paper WP. If it is assumed that the side from which the web paper WP is fed as upstream and the side to which the web paper WP is taken up as downstream, the paper feeder 3 is located upstream of the printing apparatus body 5. Here, the web paper WP corresponds to the print medium in the present invention.

The printing apparatus body 5 includes two drive rollers 9 and 11, a plurality of transport rollers 13, and nip rollers 15. The drive roller 9 is located adjacent to an inlet of the printing apparatus body 5. The drive roller 11 is located adjacent to an outlet of the printing apparatus body 5. The two drive rollers 9 and 11 are supported rotatably, and are each driven by an electric motor. The drive roller 9 takes up the web paper WP from the paper feeder 3. The drive roller 11 feeds out the web paper WP to the take-up roller 7. The two drive rollers 9 and 11 each apply power for transportation to the web paper WP. The transport rollers 13 are supported rotatably, and guide the web paper WP. The transport rollers 13 include no electric motor like the drive roller 11, and apply no power for transportation to the web paper WP.

The printing apparatus body 5 further includes a printing unit 19, a drying mechanism 21, a cooling unit 23, and an inspecting unit 25 in this order from upstream.

The printing unit 19 causes inks (ink droplets) to adhere to a printing face FF of the web paper WP to be transported. The printing unit 19 includes four inkjet heads 19A to 19D, for example. The four inkjet heads 19A to 19D eject ink droplets by a piezoelectric element system or a thermal (bubble) system, for example. The most upstream inkjet head 19A ejects black (K) ink droplets. The next inkjet head 19B ejects cyan (C) ink droplets. The next inkjet head 19C ejects magenta (M) ink droplets. The next inkjet head 19D ejects yellow (Y) ink droplets.

Here in this embodiment, the printing unit 19 includes the four inkjet heads 19A to 19D, but this is not limitative. For example, the printing unit 19 may include one inkjet head, or two or six inkjet heads.

The drying mechanism 21 heats the web paper WP unloaded (transported) from the printing unit 19 to dry inks. The detailed construction of the drying mechanism 21 is to be mentioned later. The cooling unit 23 cools the web paper WP heated by the drying mechanism 21. The cooling unit 23 includes, for example, a water-cooled roller containing a flow path through which cooling water flows. The inspecting unit 25 includes a charge coupled device (CCD) sensor or a contact image sensor (CIS), for example. The inspecting unit 25 inspects figures printed on the web paper WP.

The printing apparatus 1 includes a controller 27 and a memory unit (e.g., memory) not shown. The controller 27 includes a central processing unit (CPU). The controller 27 controls elements of the printing apparatus 1 (e.g., printing unit 19 and drying mechanism 21). The memory unit stores programs necessary for operation of the printing apparatus 1.

1. Construction of Drying Mechanism 21

The following describes the drying mechanism 21 as the characteristic of the present invention. Reference is made to FIG. 2.

1-1. Construction of Rollers

The drying mechanism 21 includes eight transport rollers R1 to R8, a printing face contact roller 31, and seven transport rollers 33. Here, the transport rollers and the printing face contact roller are each referred to as a "roller" appropriately. The printing face FF of the web paper WP is a face to which the printing unit 19 causes inks to adhere. The rear face BF is a face opposite to the printing face FF and to which no inks adhere.

The rollers R1 to R8, 31, and 33 each have the same configuration as that of the transport rollers 13 described above. Specifically, the rollers R1 to R8, 31, and 33 are each supported rotatably, and guide the web paper WP. The transport rollers R1 to R8, 31, and 33 each include no electric motor like the drive roller 11, and apply no power for transportation to the web paper WP.

The eight transport rollers R1 to R8 contact the rear face BF of the web paper WP unloaded from the printing unit 19 to turn a transportation direction of the web paper WP. The printing face contact roller 31 is located downstream of the eight transport rollers R1 to R8, and contacts the printing face FF of the web paper WP to turn the transportation direction of the web paper WP. The web paper WP is transported by the eight transport rollers R1 to R8 and the printing face contact rollers 33 in a swirling form. As is apparent from the description below, the transport roller R3 corresponds to the first turning roller in the present invention, the transport roller R4 corresponds to the second turning roller in the present invention, the transport roller R6 corresponds to the third turning roller in the present invention, the transport roller R7 corresponds to the fourth turning roller in the present invention, and the printing face contact roller 31 corresponds to the printing face contact roller in the present invention.

Firstly, the web paper WP unloaded from the printing unit 19 is transported to the roller 13A, the roller R1, the roller R2, and the roller R3 in this order. These transport rollers 13A and R1 to R3 are located downstream of the printing unit 19 and forward of the printing unit 19 in plan view.

The transport roller 13A is located downstream of the printing unit 19 (i.e., inkjet head 19D) and upstream of the transport roller R3. The transport roller 13A is located adjacent to the inkjet head 19D. The transport roller 13A contacts the rear face BF of the web paper WP. The three transport rollers 13A, R1 and R2 each guide the web paper WP diagonally downward such that the printing face FF of the web paper WP is directed upward. An inclination angle (absolute value) of the web paper WP increases toward the transport roller R3. The transport rollers 13A, R1 and R2 correspond to the guide roller in the present invention. The transport roller R3 corresponds to the first turning roller. The transport roller R3 turns a direction of the web paper WP, whose direction is turned by the three transport rollers 13A, R1, and R2, vertically downward.

After transported to the transport roller R3, the web paper WP is transported to the rollers R4, R5, R6, R7, and R8 in this order.

The transport roller R4 corresponds to the second turning roller. The transport roller R4 turns a direction of the web paper WP, whose direction is turned by the transport roller R3, diagonally downward such that the printing face FF of the web paper WP is directed downward. The transport roller R5 is positioned lower in level than the transport roller R4. The transport roller R5 turns a direction of the web paper WP diagonally upward such that the printing face FF of the web paper WP is directed downward. The transport roller R6 is positioned higher in level than the transport roller R5. Moreover, the transport roller R6 is positioned substantially equal in level to the transport roller R4.

The transport roller R6 corresponds to the third turning roller. The transport roller R6 turns a direction of the web paper WP, whose direction is turned by the two transport rollers R4 and R5, vertically upward. The transport roller R7 is positioned higher in level than the transport roller R6. The transport roller R7 is positioned substantially equal in level to the transport roller R3. Moreover, the transport roller R7 is located between the transport roller R6 and a part of the web paper WP, transported from the transport roller 13A to the transport roller R3. Here, as shown in FIG. 2, the four transport rollers R3, R4, R6, and R7 are arranged in substantially a rectangular shape when seen from a width direction orthogonal with respect to a transportation direction TD of the web paper WP.

The transport roller R7 corresponds to the fourth turning roller. The transport roller R7 turns a direction of the web paper WP, whose direction is turned by the transport roller R6, diagonally downward such that the printing face FF is directed upward. The transport roller R8 is positioned lower in level than the transport roller R7. As shown in FIG. 2, the transport roller R8 and the printing face contact roller 31 are located among the four transport rollers R3, R4, R6, and R7. In other words, the transport roller R8 and the printing face contact roller 31 are enclosed with a part of the web paper WP transported between the two transport rollers R3 and R7. Moreover, the transport roller R8 and the printing face contact roller 31 are located adjacent to the transport roller R4 so as to transport the web paper WP along a diagonal line in a substantially rectangular shape. Here, an inclination angle (absolute value) of the web paper WP in the transportation direction between the transport roller R8 and the printing face contact roller 31 is larger than an inclination angle (absolute value) of the web paper WP between the two transport rollers R7 and R8.

The printing face contact roller 31 corresponds to the printing face contact roller in the present invention. The printing face contact roller 31 firstly contacts the printing face FF of the web paper WP after the inks adhere. The printing face contact roller 31 folds the web paper WP with the inks being dried, thereby guiding the web paper WP toward the outlet of the drying mechanism 21. Specifically, not only the printing face contact roller 31 but the seven transport rollers 33 guide the web paper WP to the outlet of the drying mechanism 21. The seven transport rollers 33 correspond to the downstream guide roller in the present invention. The seven transport rollers 33 are located downstream of the printing face contact roller 31. The seven transport rollers 33 guide the web paper WP, folded by the printing face contact roller 31, to the outlet of the drying mechanism 21 while passing the web paper WP through a clearance (gap) CL1 formed by a part of the web paper WP transported between the two transport rollers 13A and R3 and a part of the web paper WP transported between the transport roller R7 and the printing face contact roller 31. Here the number of rollers 13A, R1 to R8, 31, and 33 is set appropriately.

1-2. Construction of Four Heating Units H1 to H4

The drying mechanism 21 also includes four heating units H1 to H4. The four heating units H1 to H4 heat the web paper WP guided by the transport rollers 13A, R1 to R8, and the printing face contact roller 31. The fourth heating unit H4, the first heating unit H1, the second heating unit H2, and the third heating unit H3 are arranged in this order along the transportation path of the web paper WP. The four heating units H1 to H4 heat the web paper WP in a non-contact manner. As is apparent from the description below, the heating unit H1 corresponds to the first heating unit in the present invention, the heating unit H2 corresponds to the second heating unit in the present invention, the heating unit H3 corresponds to the third heating unit in the present invention, and the heating unit H4 corresponds to the fourth heating unit in the present invention.

The fourth heating unit H4 faces the printing face FF of the web paper WP between the two transport rollers 13A and R3 (specifically, two transport rollers R1 and R2). That is, the fourth heating unit H4 is located adjacent to the printing face FF of the web paper WP transported between the two transport rollers 13A and R3. The first heating unit H1 faces the printing face FF of the web paper WP between the two transport rollers R3 and R4. The second heating unit H2 faces the printing face FF of the web paper WP between the two transport rollers R6 and R7. The third heating unit H3 faces the printing face FF of the web paper WP between the transport roller R7 and the printing face contact roller 31 (specifically, two transport rollers R7 and R8). That is, none of the four heating units H1 to H4 in the present embodiment faces the rear face BF of the web paper WP.

Moreover, the web paper WP is transported between the two transport rollers R4 and R6 without being heated by any heating units. The following describes the reason for this. The printing face FF is directed downward between the two transport rollers R4 and R6. Accordingly, if the front side face (adjacent to a heating portion) of the heating unit faces the printing face FF, the front side face of the heating unit is directed upward. This leads to overheating of the web paper WP due to contacting to the front side face of the heating unit when the web paper WP slackens. In order to avoid such overheating of the web paper WP, the web paper WP is transported between the two transport rollers R4 and R6 without being heated by any heating units.

Moreover, the fourth heating unit H4 heats the printing face FF of the web paper WP transported between the two transport rollers 13A and R3 with infrared rays (electromagnetic waves), for example. Here, the two transport rollers R1 and R2 are configured not to enter a region where the fourth heating unit H4 applies infrared rays (heating region), for example. This prevents overheating of the two transport rollers R1 and R2. This is similarly applicable to the other heating units H1 to H3.

Figure 3A:
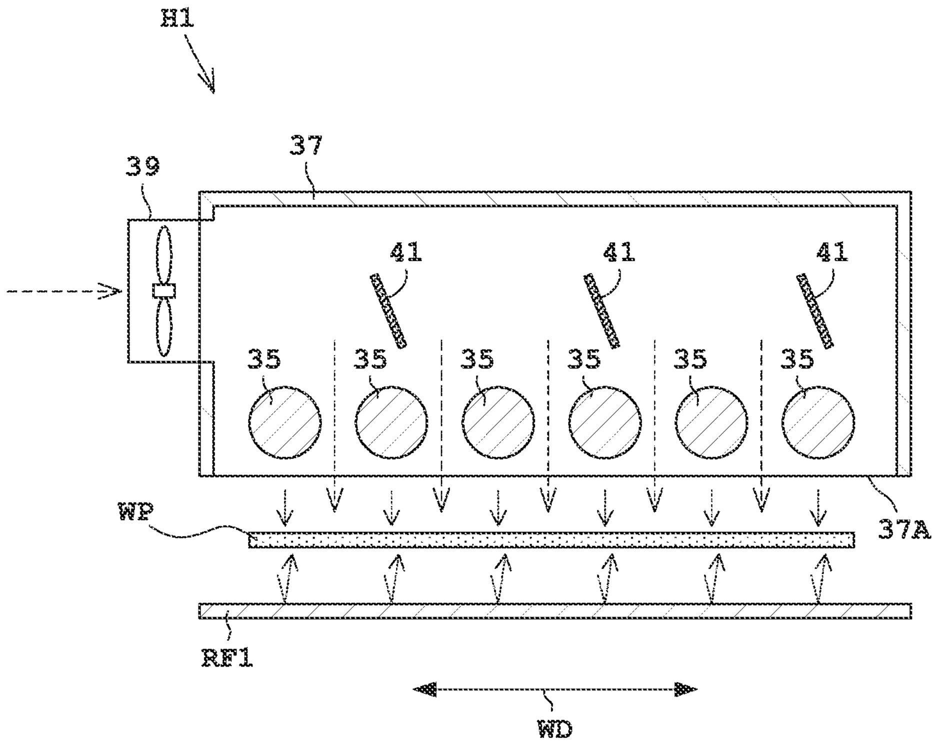
FIG. 3A is a longitudinal sectional view of heating units arranged along a width direction of web paper.
Figure 3B:
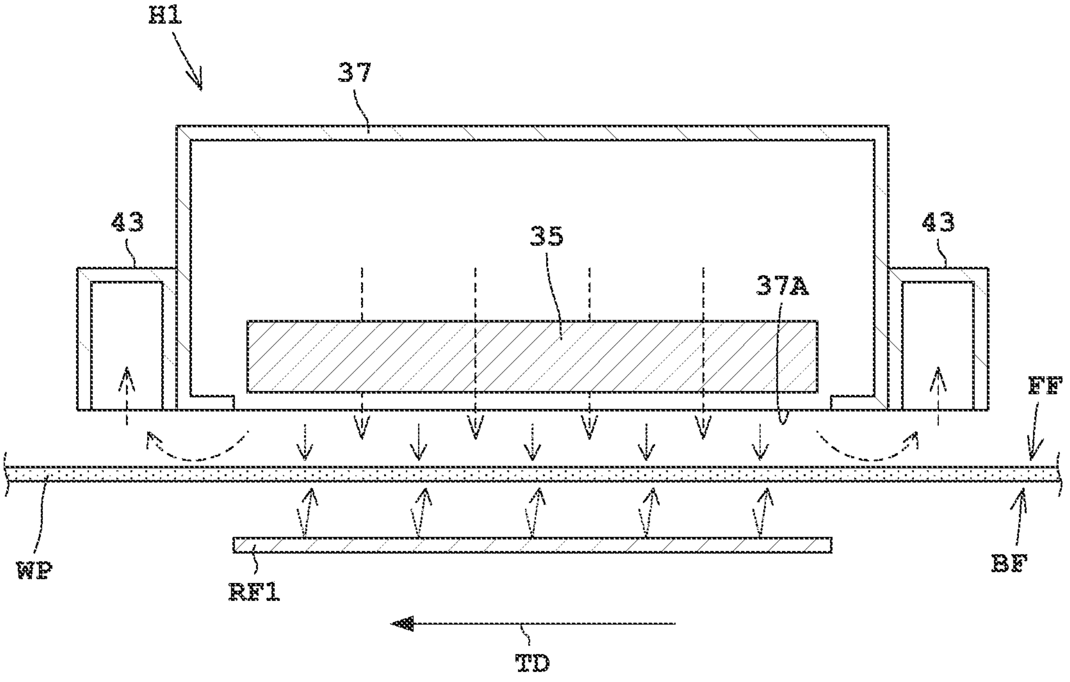
FIG. 3B is a longitudinal sectional view of the heating units arranged along a transportation direction of the web paper.

FIG. 3A is a longitudinal sectional view of the heating unit H1 arranged along a width direction WD of the web paper WP. FIG. 3B is a longitudinal sectional view of the heating unit H1 arranged along a transportation direction TD of the web paper WP. The width direction WD is orthogonal to the transportation direction TD. The four heating units H1 to H4 have the same construction. Accordingly, the following describes a detailed construction of the first heating unit H1 as a representative of the above heating units.

The first heating unit H1 includes a plurality of carbon heaters 35 configured to emit infrared rays to the web paper WP. The carbon heaters 35 are located to be flush with one another along the width direction WD. The carbon heaters 35 are each formed in a bar shape, and are arranged longitudinally along the transportation direction TD. Accordingly, the carbon heaters 35 are arranged in a two-dimensional plane so as to be in parallel to the web paper WP. It should be noted that the first heating unit H1 may include not a plurality of carbon heaters 35 but one carbon heater 35. In this case, the one carbon heater 35 bends to be arranged in a two-dimensional plane.

The carbon heaters 35 emit infrared rays to the printing face FF, allowing direct heating of the printing face FF (inks and web paper WP). With use of the carbon heaters 35, infrared rays having an optimum wavelength for heating (drying) the inks can be emitted. That is, the carbon heaters 35 can emit infrared rays with a wavelength that are easily absorbed into water.

The carbon heaters 35 are accommodated in a casing 37. The casing 37 is formed in a cuboid shape. The casing 37 has an opened front side face 37A. It should be noted that a grid fence, not shown, may be provided at the front side face 37A so as to prevent contact of the web paper WP to the carbon heaters 35.

Moreover, the first heating unit H1 includes a gas-blowing fan 39 and guide plates 41. The gas-blowing fan 39 is provided on a side face of the casing 37, and is driven by an electric motor. The gas-blowing fan 39 blows gas into the casing 37. Thereby, ambient gas around the carbon heaters 35 that is heated with the carbon heaters 35 can be fed out to the printing face FF. Moreover, the guide plates 41 are provided within the casing 37, and are configured to cause wind to flow uniformly from the front side face 37A of the casing 37. That is, the first heating unit H1 is configured to heat the printing face FF with radiant heat of the carbon heaters 35 and also to blow warm gas to the printing face FF. Here, the gas-blowing fan 39 corresponds to the gas-blowing unit in the present invention.

Moreover, the first heating unit H1 includes two exhaust units 43. The two exhaust units 43 are provided on upstream and downstream side faces of the casing 37 so as to sandwich the casing 37 accommodating the carbon heaters 35 and the like. The two exhaust units 43 each have an opening directed toward the printing face FF. Thereby, warm gas that the gas-blowing fan 39 blows through the front side face 37A can be exhausted upstream and downstream of the casing 37.

Moreover, as shown in FIGS. 2, 3A, and 3B, the printing apparatus 1 includes four reflectors RF1 to RF4. The fourth reflector RF4 is located opposite to the fourth heating unit H4 across the web paper WP transported between the two transport rollers 13A and R3. Likewise, the first reflector RF1 is located opposite to the first heating unit H1 across the web paper WP transported between the two transport rollers R3 and R4. The second reflector RF2 is located opposite to the second heating unit H2 across the web paper WP transported between the two transport rollers R6 and R7. The third reflector RF3 is located opposite to the third heating unit H3 across the web paper WP transported between the transport roller R7 and the printing face contact roller 31.

The four reflectors RF1 to RF4 are each formed by glossy metal. The four reflectors RF1 to RF4 each reflect infrared rays emitted from the carbon heaters 35 and passing through the web paper WP. The reflected infrared rays can again be emitted to the web paper WP. This can lead to effective usage of the infrared rays emitted from the carbon heaters 35.

Moreover, in FIG. 2, the three heating units H1, H2, and H4 are arranged such that the front side faces 37A thereof are directed toward the third heating unit H3. Here, at least three reflectors RF1, RF2, and RF4 are arranged, achieving avoidance of excess thermal transmission from outside to the third heating unit H3.

The drying mechanism 21 also includes an exhaust gas collecting unit, not shown. The exhaust gas collecting unit is located above the rollers 13A, R1 to R8, 31, 33 and the four heating units H1 to H4. The exhaust gas collecting unit is connected to the exhaust units 43 of the four heating units H1 to H4 individually. The exhaust gas collecting unit collects gas sucked from the exhaust units 43 individually, and feeds the collected gas to a duct in a factory.

1-3. Construction of Maintenance Space MS1, MS2

Reference is made to FIG. 2. The drying mechanism 21 has two maintenance spaces MS1 and MS2 for maintenance. The first maintenance space MS1 is enclosed with a part of the web paper WP transported from the transport roller R4 to the printing face contact roller 31. Moreover, the first maintenance space MS1 has a side face formed in a shape (e.g., quadrangle) that follows the web paper WP transported from the transport roller R4 to the printing face contact roller 31.

Moreover, the second maintenance space MS2 is enclosed with a part of the web paper WP transported from the transport roller 33A to the transport roller 33C and the third heating unit H3. The second maintenance space MS2 has a side face formed in substantially an L-shape. Here, the two maintenance spaces MS1 and MS2 have no element arranged therein.

Now, paper feed operation will be described as one example of the maintenance. Reference is made to FIG. 1. Paper feed operation is made, prior to printing operation, that feeds the web paper WP from the paper feeder 3 to the inside of the printing apparatus body 5. Such operation is also made in the drying mechanism 21. One end of the web paper WP from the paper feeder 3 is attached to a transportation bar 51. See FIGS. 4A and 4B. In order to feed the transportation bar 51 along the transportation path of the web paper WP, two guide rails, not shown, are provided. The two guide rails are arranged across the web paper WP in the width direction WD, and guides both ends of the transportation bar 51.

Reference is made to FIG. 2. An operator feeds the transportation bar 51 from the transport roller 13A. The transportation path is inclined downward within a section from the transport roller 13A to the transport roller R5. Since the transportation bar 51 moves along an inclination of the transportation path by its own weight, the transportation bar 51 is fed to the transport roller R5 relatively smoothly.

Figure 4A:
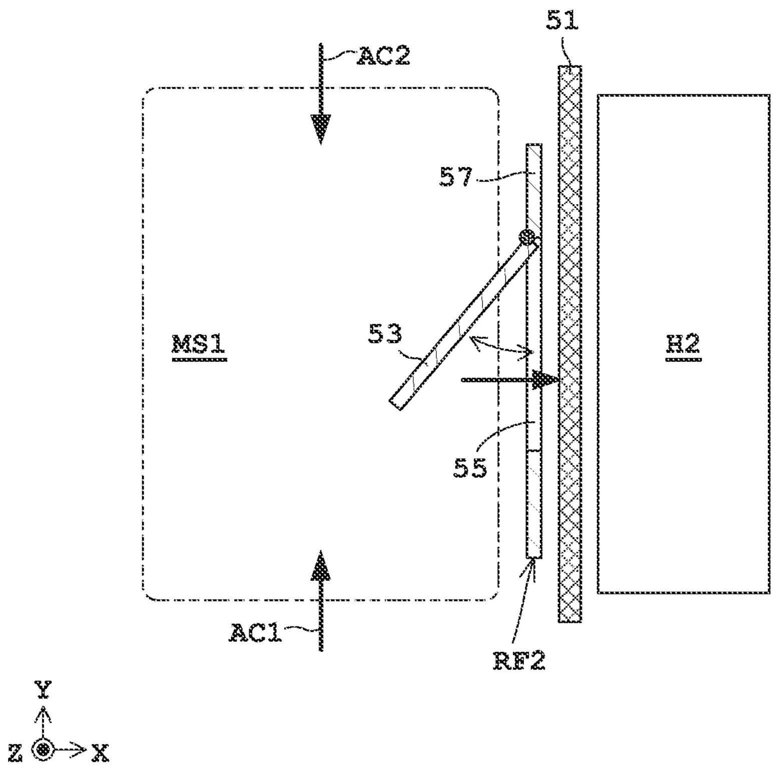
FIG. 4A is a plan view illustrating a maintenance space.
Figure 4B:
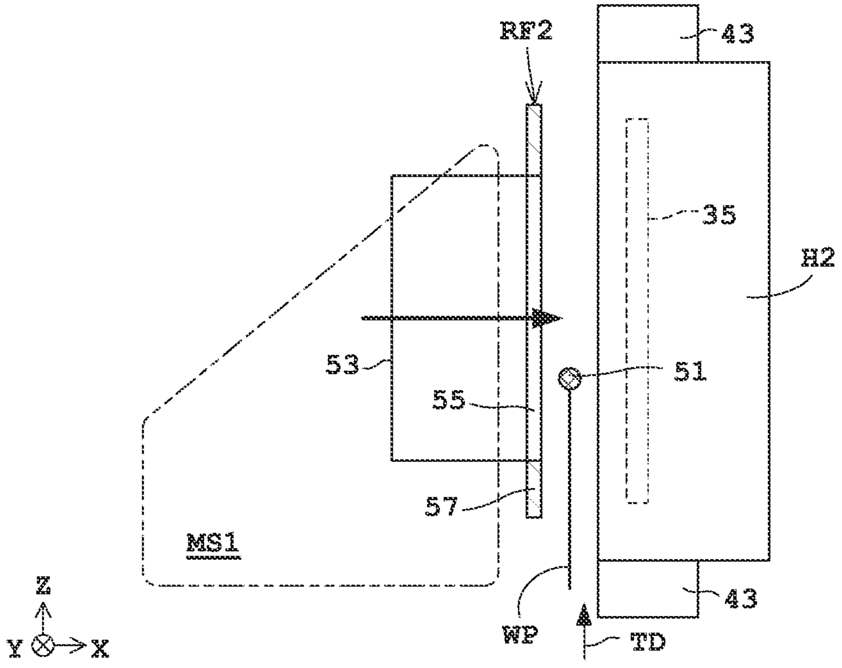
FIG. 4B is a side view of the elements in FIG. 4A.

The operator advances the operator's hand into the first maintenance space MS1 along the width direction WD (e.g., an arrow AC1 in FIG. 4A). Thereafter, the operator moves the transportation bar 51 from the transport roller R5 to the vicinity of a position where the transportation bar 51 passes through the transport roller R7 while holding the transportation bar 51. Now description will be made of a door 53 of the second reflector RF2 used for transporting the transportation bar 51 between the two transport rollers R6 and R7. Reference is made to FIGS. 4A and 4B.

The second reflector RF2 has the door 53, an opening 55, and a reflector body 57. The opening 55 is provided in the reflector body 57. The door 53 is rotatably attached to the reflector body 57 to open and close the opening 55. The operator opens the door 53. Thereafter, the operator moves the transportation bar 51 between the two transport rollers R6 and R7 while advancing the operator's hand into the opening 55 more deeply. Here in FIG. 4A, the door 53 may be configured to open in a direction where the operator's hand easily advances the opening 55 when the operator's hand enters along the arrow AC2. Moreover, the door 53 may be configured slidably or detachably.

After the transportation bar 51 passes the transport roller R7, the transportation path is inclined downward within a section from the transport roller R7 to the printing face contact roller 31. Accordingly, the transportation bar 51 is fed to the transport roller R5 relatively smoothly. Thereafter, the operator advances the operator's hand into the second maintenance space MS2 along the width direction WD, which case is similar to the first maintenance space MS1. Thereafter, the operator moves the transportation bar 51 from the printing face contact roller 31 to the transport roller 33C while holding the transportation bar 51. Thereafter, the operator further moves the transportation bar 51. This causes the web paper WP to be fed in the drying mechanism 21.

2. Operation of Printing Apparatus 1

An operation of the printing apparatus 1 will now be described with reference to FIGS. 1 and 2. The paper feeder 3 feeds the web paper WP to the printing apparatus body 5. The printing unit 19 ejects inks (ink droplets) to the web paper WP, and the web paper WP is transported to the drying mechanism 21. Here, the face of the web paper WP to which the inks adhere is the printing face FF. The face opposite to the printing face FF is the rear face BF.

Reference is made to FIG. 2. The web paper WP is transported from the transport roller 13A to the printing face contact roller 31 in a swirling form while passing through the eight transport rollers R1 to R8. The web paper WP is transported diagonally downward (i.e., a combination direction of forward and downward) while the printing face FF thereof is directed upward within a section from the transport roller 13A to the transport roller R3. In this section, the fourth heating unit H4 heats the web paper WP in a non-contact manner.

Thereafter, the web paper WP is transported vertically downward within a section between the two transport rollers R3 and R4. In this section, the first heating unit H1 heats the web paper WP in a non-contact manner. Thereafter, the web paper WP is transported while the printing face FF is directed downward within a section between the two transport rollers R4 and R6. Moreover, in this section, the web paper WP is transported without being heated by the same heating unit as the first heating unit H1, for example, Thereafter, the web paper WP is transported vertically upward within a section between the two transport rollers R6 and R7. In this section, the second heating unit H2 heats the web paper WP in a non-contact manner. Thereafter, the web paper WP is transported diagonally downward while the printing face FF thereof is directed upward within a section from the transport roller R7 to the printing face contact roller 31. In this section, the third heating unit H3 heats the web paper WP in a non-contact manner. Thereby, the web paper WP is heated by the four heating units H1 to H4. This dries the inks on the printing face FF.

Thereafter, the printing face contact roller 31 firstly contacts the printing face FF of the web paper WP after the printing unit 19 causes the inks to adhere. The inks on the printing face are dry enough not to transfer. Accordingly, the inks are prevented from transferring even when the printing face contact roller 31 contact roller contacts the printing face. The printing face contact roller 31 folds the web paper WP while contacting the printing face FF. The seven transport rollers 33 guide the web paper WP, folded by the printing face contact roller 31, to the outlet of the drying mechanism 21 and to the cooling unit 23 while passing a clearance CL1 formed by a part of the web paper WP transported between the transport roller 13A and the transport roller R3 and a part of the web paper WP transported between the transport roller R7 and the printing face contact roller 31. That is, the seven transport rollers 33 guide the web paper WP to the outlet of the drying mechanism 21 while guiding the web paper WP, wound toward the inside of the swirling form, toward the outside of the swirling form.

The cooling unit 23 cools the web paper WP heated by the drying mechanism 21. The drying mechanism 21 does not overheat the web paper WP, achieving reduction in load on the cooling unit 23. Thereafter, the web paper WP cooled by the cooling unit 23 is transported to the inspecting unit 25. The inspecting unit 25 inspects a printed region (characters and figures). The web paper WP inspected by the inspecting unit 25 is wound up by the take-up roller 7.

According to the present embodiment, the web paper WP is transported to the printing face contact roller 31 in a swirling form while the transport rollers 13A, and R1 to R8 turn the direction of the web paper WP. The printing face contact roller 31 firstly contacts the printing face FF after the inks adhere. The heating units H1 to H4 are arranged so as to face the printing face FF of the web paper WP between the two transport rollers 13A and R3, between the two transport rollers R3 and R4, between the two transport rollers R6 and R7, and between the transport roller R7 and the printing face contact roller 31, respectively. Such arrangement can achieve a compact drying mechanism 21, i.e., a compact printing apparatus 1.

Moreover, the heating units H1 to H4 each face the printing face FF, and thus can directly heat the inks adhering to the printing face FF. Accordingly, the inks can be dried while the web paper WP is not overheated. Moreover, the heating units H1 to H4 are not arranged upward. Moreover, the heating units are not each arranged in a section where the printing face FF is directed downward (between the two transport rollers R4 and R6). This is because the heating units to be arranged are directed upward. Accordingly, such arrangement can prevent the web paper WP from contacting to the front side face 37A (front) of each of the heating units H1 to H4 when the web paper WP slackens. This can prevent overheating of the web paper WP.

Moreover, the transport roller R7 turns a direction of the web paper WP, whose direction is turned by the transport roller R6, diagonally downward such that the printing face FF is directed upward. The third heating unit H3 is inclined along the web paper WP whose direction is turned by the transport roller R7. As a result, the third heating unit H3 can be arranged effectively with use of a cuboid space between a part of the web paper WP transported between the transport rollers R3 and R4 and a part of the web paper WP transported between the transport rollers R6 and R7. This can achieve a compact drying mechanism 21.

The transport roller R3 turns a direction of the web paper WP, unloaded from the printing unit 19, vertically downward, and the transport roller R6 turns a direction of the web paper WP, whose direction is turned by the transport rollers R4 and R5, vertically upward. Accordingly, the two heating units H1 and H2 can each be erected vertically. As a result, a compact drying mechanism 21 is obtainable in a horizontal longitudinal direction (front-back direction) where the two heating units H1 and H2 are arranged.

The drying mechanism 21 does not include a currently-used heating drum. The heating drum needs a relatively long preparation period from actuation to actual operation. In addition, the heating drum easily affects a transportation condition of the web paper WP. As a result, the drying mechanism 21 according to the present embodiment can relatively shorten the preparation period and can suppress the effect of the transportation condition of the web paper WP.

SECOND EMBODIMENT

Figure 5:
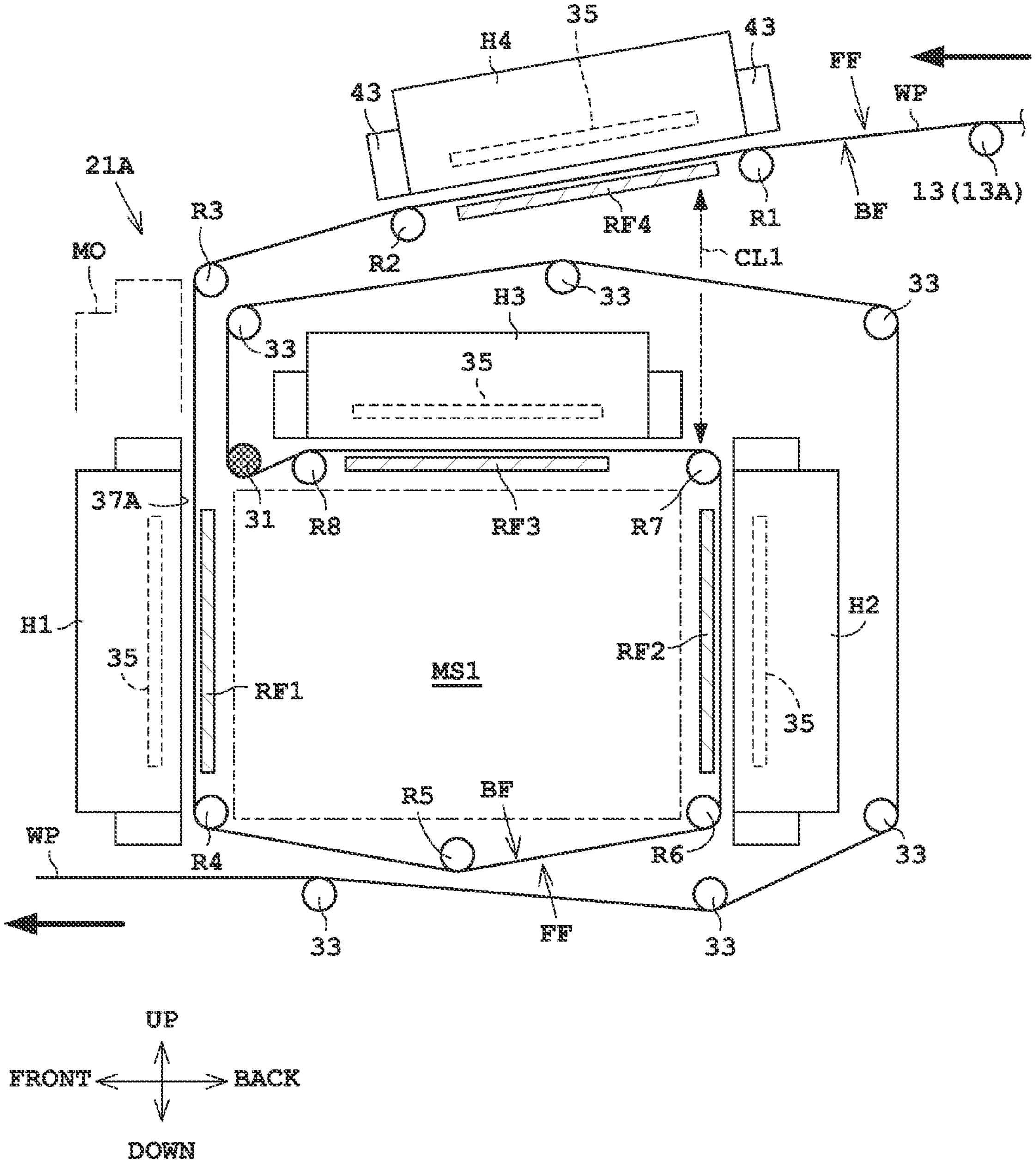
FIG. 5 illustrates a drying mechanism according to a second embodiment.

A second embodiment of the present invention will now be described with reference to the drawings. Here, the description common to that of the first embodiment is to be omitted. FIG. 5 schematically illustrates a printing apparatus according to a second embodiment of the present invention.

In the first embodiment, the transport roller R7 turns a direction of the web paper WP diagonally downward such that the printing face FF is directed upward. See FIG. 2. In this regard, in the second embodiment, the transport roller R7 may turn a direction of the web paper WP horizontally such that the printing face FF is directed upward. That is, the third heating unit H3 is located horizontally.

Reference is made to FIG. 5. The web paper WP is transported within a section from the transport roller 13A to the transport roller R7, which is similar to the first embodiment. Thereafter, the transport roller R7 turns a direction of the web paper WP, whose direction is turned by the transport roller R6, horizontally such that the printing face FF is directed upward while the transport roller R7 contacting the rear face BF of the web paper WP. Accordingly, the web paper WP is transported horizontally within a section between the two transport rollers R7 and R8. Moreover, the third heating unit H3, i.e., the carbon heaters 35 are located horizontally.

The present embodiment produces the same effect as that of the first embodiment. However, as shown in FIG. 5, the third heating unit H3 (carbon heaters 35) is not inclined between the two heating units H1 and H2. Accordingly, a drying mechanism 21A shown in FIG. 5 may possibly be made larger in a height direction than the drying mechanism 21 shown in FIG. 2.

Here in FIG. 5, the first heating unit H1 is located at the same level as the second heating unit H2. In this regard, as denoted by the numeral MO in FIG. 5, the first heating unit H1 may be positioned higher in level than the second heating unit H2.

THIRD EMBODIMENT

Figure 6:
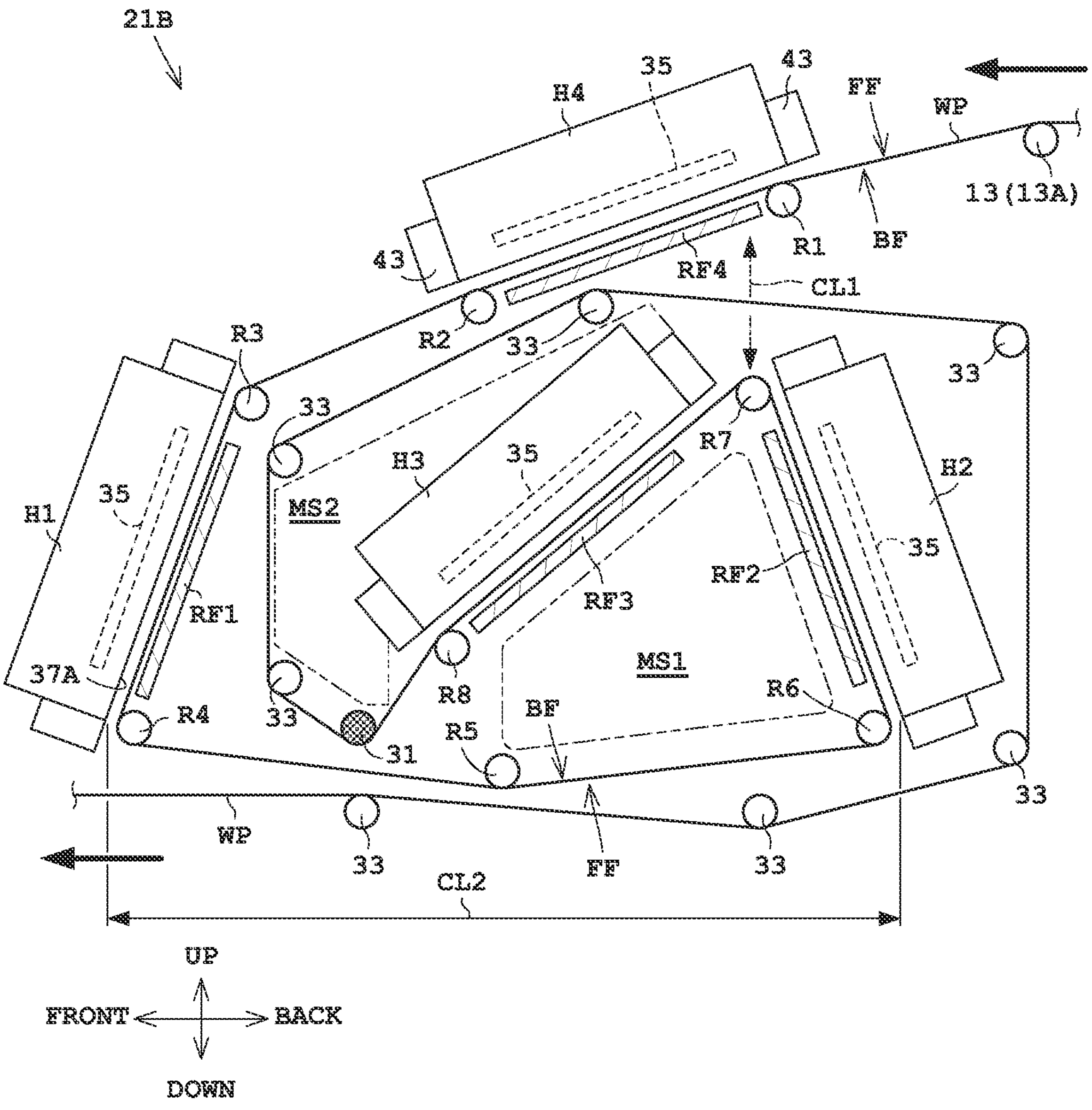
FIG. 6 illustrates a drying mechanism according to a third embodiment.

A third embodiment of the present invention will now be described with reference to the drawings. Here, the description common to that of the first and second embodiments is to be omitted. FIG. 6 schematically illustrates a printing apparatus according to the third embodiment of the present invention.

In the first and second embodiments, the transport roller R3 turns a direction of the web paper WP vertically downward, and the transport roller R6 turns a direction of the web paper WP vertically upward. See FIG. 2. In this regard, in the third embodiment, the transport roller R3 may turn a direction of the web paper WP diagonally downward such that the printing face FF is directed upward, and the transport roller R6 may turn a direction of the web paper WP diagonally upward such that the printing face FF is directed upward.

Reference is made to FIG. 6. The transport roller R3 turns a direction of the web paper WP, whose direction is turned by the transport roller R2, diagonally downward such that the printing face FF is directed upward while the transport roller R3 contacts the rear face BF of the web paper WP. Moreover, the transport roller R6 turns a direction of the web paper WP, whose direction is turned by the transport roller R5, diagonally upward such that the printing face FF is directed upward while transport roller R6 contacts the rear face BF. Accordingly, the two heating units H1 and H2 are arranged such that a clearance CL2 between the two heating units H1 and H2 becomes larger toward downward.

The present embodiment produces the same effect as that of the first embodiment. Moreover, both the two heating units H1 and H2 are arranged diagonally. Accordingly, a drying mechanism 21B shown in FIG. 6 may possibly be made smaller in a height direction than the drying mechanism 21 shown in FIG. 2. On the other hand, the drying mechanism 21B shown in FIG. 6 may possibly be made larger in the front-back direction than the drying mechanism 21 shown in FIG. 2.

FOURTH EMBODIMENT

Figure 7:
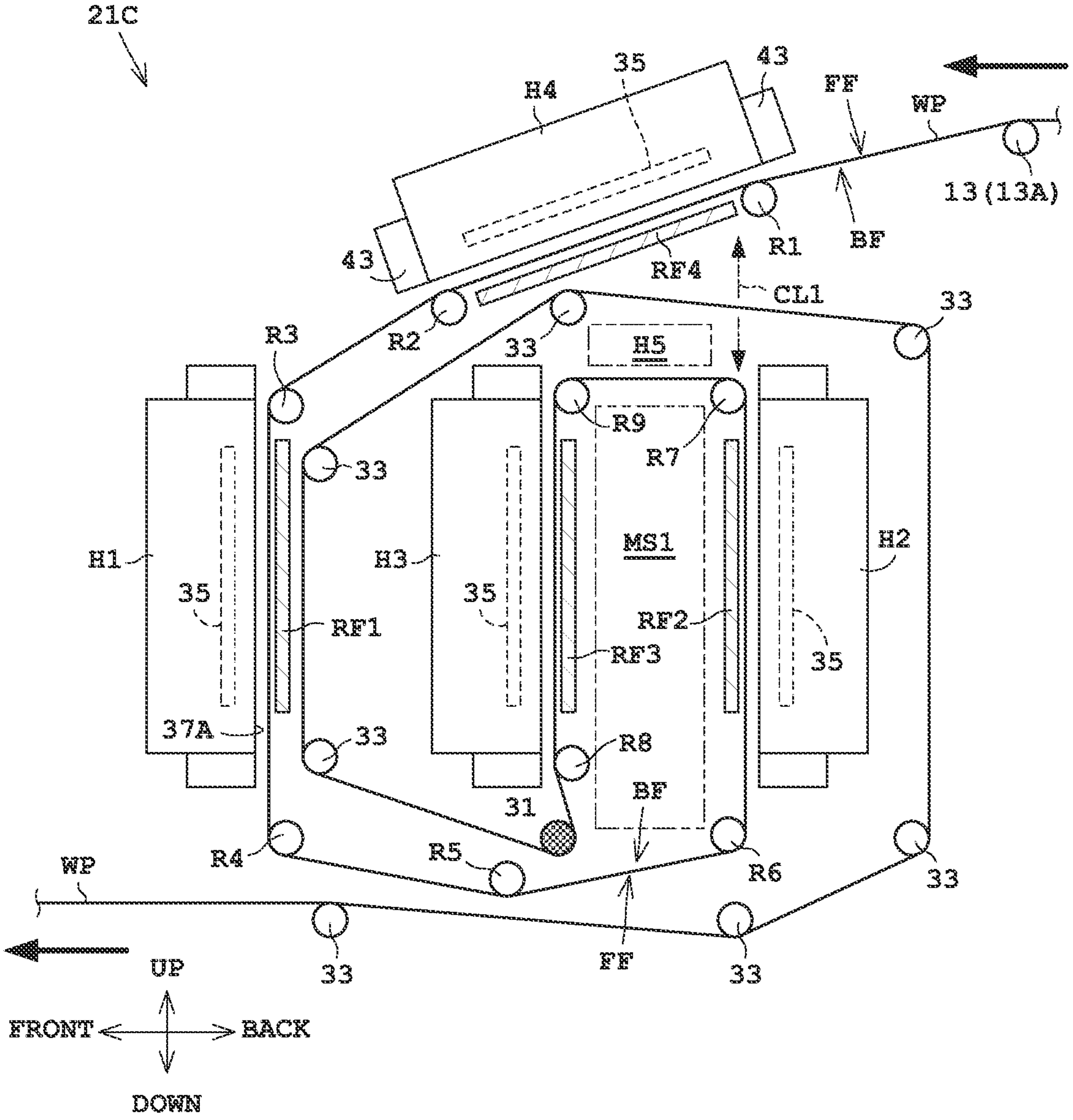
FIG. 7 illustrates a drying mechanism according to a fourth embodiment.

A fourth embodiment of the present invention will now be described with reference to the drawings. Here, the description common to that of the first embodiment is to be omitted. FIG. 7 schematically illustrates a printing apparatus according to the fourth embodiment of the present invention.

In the first embodiment, the transport roller R7 turns a direction of the web paper WP, and transports the web paper WP, whose direction is turned by the transport roller R7, to the downstream transport roller R8. See FIG. 2. In this regard, in the fourth embodiment, the two transport rollers R7 and R9 may turn a direction of the web paper WP, and may transport the web paper WP, whose direction is turned by the two transport rollers R7 and R9, to the downstream transport roller R8.

Reference is made to FIG. 7. The transport roller R7 turns a direction of the printing face FF, whose direction is turned by the transport roller R6, horizontally such that the printing face FF is directed upward while contacting the rear face BF. Here, the transport roller R7 may turn a direction of the web paper WP, other than to a horizontal direction, as long as the printing face FF is directed upward. The transport roller R9 is located between the two transport rollers R7 and R8. That is, the transport roller R9 is located downstream of the transport roller R7 and upstream of the transport roller R8. The transport roller R9 corresponds to the fifth turning roller in the present invention. The transport roller R9 turns a direction of the web paper WP, whose direction is turned by the transport roller R7 corresponding to the fourth turning roller, vertically downward while transport roller R9 contacts the rear face BF. Moreover, the third heating unit H3 faces the printing face FF of the web paper WP between the two transport rollers R9 and R8. The third heating unit H3 is erected vertically like the two heating units H1 and H2.

The present embodiment produces the same effect as that of the first embodiment. The third heating unit H3 is erected vertically. A drying mechanism 21C shown in FIG. 7 may possibly be made smaller in the front-back direction than the drying mechanism 21 shown in FIG. 2. On the other hand, the printing face contact roller 31 is positioned lower in level than the third heating unit H3. Accordingly, a drying mechanism 21C shown in FIG. 7 may possibly be made larger in a height direction than the drying mechanism 21 shown in FIG. 2.

The present invention is not limited to the foregoing examples, but may be modified as follows.

(1) In the embodiments described above, the drying mechanism 21 includes the four heating units H1 to H4. In this regard, the drying mechanism 21 may include five or more heating units. For example, as shown in FIG. 7 by chain double-dashed lines, the drying mechanism 21C may further include a fifth heating unit H5 provided between the two transport rollers R7 and R9. In this case, since the fifth heating unit H5 is configured in the same manner as the four heating units H1 to H4, the drying mechanism 21 becomes long in the front-back direction. In addition, the fourth heating unit H4 is not necessarily provided when inks on the printing face are sufficiently dried by the three heating units H1 to H3 until the web paper WP reaches the printing face contact roller 31.

(2) In the embodiments and the modification 1 described above, the heating units H1 to H4 each include the carbon heaters 35 as a heater. However, this is not limitative. The heater may be one for heating by supplying electricity to a halogen lamp or a Nichrome wire, for example.

(3) In the embodiments and the modifications described above, the heating units H1 to H4 each include the gas-blowing fan 39 and the exhaust unit 43. In this regard, the heating units H1 to H4 each need not include both of the gas-blowing fan 39 and the exhaust unit 43 as necessary. Moreover, the drying mechanism 21 includes the four reflectors RF1 to RF4. In this regard, the drying mechanism 21 need not include the four reflectors RF1 to RF4 as necessary. Moreover, the drying mechanism 21 has the two maintenance spaces MS1 and MS2. In this regard, the drying mechanism 21 need not include both of the two maintenance spaces MS1 and MS2 as necessary.

(4) In the embodiments and the modifications described above, the drying mechanism 21 does not include a drive roller driven by an electric motor. In this regard, the drying mechanism 21 may include a drive roller.

(5) In the embodiments and the modifications described above, the printing apparatus 1 performs printing on one face (first face) of the web paper WP, but may perform printing on both faces (first face and second faces) of the web paper WP. When the printing apparatus 1 performs printing on the first face of the web paper WP, the first face corresponds to the printing face FF and the second face corresponds to the rear face BF. Then, when the printing apparatus 1 performs printing on the second face of the web paper WP, the second face is changed to the printing face FF and the first face is changed to the rear face BF.

(6) In the embodiments and the modifications described above, the web paper (continuous paper) WP has been described as one example of the elongated print medium. However, the print medium is not limited to paper. For example, a resin film is applicable.

(7) In the embodiments and the modifications described above, the printing unit 19 causes the inks to adhere to the web paper WP by the inkjet system. In this regard, the printing unit may cause the inks to adhere to the web paper WP by offset printing or gravure printing, for example.

The present invention may be embodied in other specific forms without departing from the spirit or essential attributes thereof and, accordingly, reference should be made to the appended claims, rather than to the foregoing specification, as indicating the scope of the invention.

What is claimed is:

1. A printing apparatus for performing printing to a print medium elongated, the printing apparatus comprising:

a printing unit configured to cause inks to adhere to a printing face of the print medium to be transported; and a drying mechanism configured to dry the inks by heating the print medium unloaded from the printing unit, the drying mechanism including:

at least a first turning roller, a second turning roller, a third turning roller, and a fourth turning roller each configured to contact a rear face of the print medium unloaded from the printing unit with no inks adhering thereto to turn a transportation direction of the print medium;

a printing face contact roller located downstream of the fourth turning roller in the transportation direction and configured to contact the printing face of the print medium to turn the transportation direction of the print medium;

at least a first heating unit and a second heating unit each configured to heat the print medium guided by the first to fourth turning rollers and the printing face contact roller;

a guide roller located downstream of the printing unit and upstream of the first turning roller and configured to guide the print medium while contacting the rear face of the print medium; and a fourth heating unit configured to heat the print medium guided by at least the guide roller, wherein the guide roller guides the print medium, unloaded from the printing unit, such that the printing face of the print medium is directed upward, the first turning roller turns a direction of the print medium guided by the guide roller vertically downward or diagonally downward such that the printing face of the print medium is directed upward, the second turning roller turns a direction of the print medium, whose direction is turned by the first turning roller, such that the printing face is directed downward, the third turning roller turns a direction of the print medium, whose direction is turned by the second turning roller, vertically upward or diagonally upward such that the printing face of the print medium is directed upward, the fourth turning roller turns a direction of the print medium, whose direction is turned by the third turning roller, horizontally such that the printing face is directed upward or diagonally downward such that the printing face is directed upward, the fourth heating unit is located so as to face the printing face of the print medium and heats the print medium in a non-contact manner between the guide roller and the first turning roller, the first heating unit is located so as to face the printing face of the print medium and heats the print medium in a non-contact manner between the first turning roller and the second turning roller, the second heating unit is located so as to face the printing face of the print medium and heats the print medium in a non-contact manner between the third turning roller and the fourth turning roller, the printing face contact roller firstly contacts the printing face of the print medium after the inks adhere, and guides the print medium to an outlet of the drying mechanism by folding the print medium with the inks being dried, and the first heating unit, the second heating unit, the fourth heating unit, or any other heating unit that is configured to heat the print medium guided by the first to fourth turning rollers, the printing face contact roller and the guide roller is not arranged below the print medium between the second turning roller and the third turning roller such that the print medium is transported without being heated between the second turning roller and the third turning roller.

2. The printing apparatus according to claim 1, wherein the guide roller turns a direction of the print medium, unloaded from the printing unit, diagonally downward such that the printing face of the print medium is directed upward, the first turning roller turns a direction of the print medium whose direction is turned by the guide roller.

3. A printing apparatus for performing printing to a print medium elongated, the printing apparatus comprising:

a printing unit configured to cause inks to adhere to a printing face of the print medium to be transported, and a drying mechanism configured to dry the inks by heating the print medium unloaded from the printing unit, the drying mechanism including:

at least a first turning roller, a second turning roller, a third turning roller, a fourth turning roller, and a fifth turning roller each configured to contact a rear face of the print medium unloaded from the printing unit with no inks adhering thereto to turn a transportation direction of the print medium;

a printing face contact roller located downstream of the fifth turning roller in the transportation direction and configured to contact the printing face of the print medium to turn the transportation direction of the print medium; and at least a first heating unit and a second heating unit each configured to heat the print medium guided by the first to fifth turning rollers and the printing face contact roller, a guide roller located downstream of the printing unit and upstream of the first turning roller and configured to guide the print medium while contacting the rear face of the print medium; and a fourth heating unit configured to heat the print medium guided by at least the guide roller, wherein the guide roller guides the print medium, unloaded from the printing unit, such that the printing face of the print medium is directed upward, the first turning roller turns a direction of the print medium guided by the guide roller vertically downward, the second turning roller turns a direction of the print medium, whose direction is turned by the first turning roller, such that the printing face is directed downward, the third turning roller turns a direction of the print medium, whose direction is turned by the second turning roller, vertically upward, the fourth turning roller turns a direction of the print medium, whose direction is turned by the third turning roller, such that the printing face is directed upward, the fifth turning roller turns a direction of the print medium, whose direction is turned by the fourth turning roller, vertically downward, the fourth heating unit is located so as to face the printing face of the print medium and heats the print medium in a non-contact manner between the guide roller and the first turning roller, the first heating unit is located so as to face the printing face of the print medium and heats the print medium in a non-contact manner between the first turning roller and the second turning roller, the second heating unit is located so as to face the printing face of the print medium and heats the print medium in a non-contact manner between the third turning roller and the fourth turning roller, the printing face contact roller firstly contacts the printing face of the print medium after the inks adhere, and guides the print medium to an outlet of the drying mechanism by folding the print medium with the inks being dried, and the first heating unit, the second heating unit, the fourth heating unit, or any other heating unit that is configured to heat the print medium guided by the first to fourth turning rollers, the printing face contact roller and the guide roller is not arranged below the print medium between the second turning roller and the third turning roller such that the print medium is transported without being heated between the second turning roller and the third turning roller.

* * * * *